United States Patent
Duesterhoeft et al.

(10) Patent No.: US 9,352,725 B2
(45) Date of Patent: May 31, 2016

(54) CONNECTING ARRANGEMENT AND METHOD FOR CONNECTING A WIPER BLADE TO A WIPER ARM FOR A WINDSCREEN WIPER SYSTEM OF A VEHICLE

(75) Inventors: Richard Duesterhoeft, Holzgerlingen (DE); Christina Nestler, Ostelsheim (DE); Heiko Schmid, Oberriexingen (DE)

(73) Assignee: Daimler AG, Stuttgart (DE)

( * ) Notice: Subject to any disclaimer, the term of this patent is extended or adjusted under 35 U.S.C. 154(b) by 437 days.

(21) Appl. No.: 13/885,533

(22) PCT Filed: Nov. 11, 2011

(86) PCT No.: PCT/EP2011/005660
§ 371 (c)(1),
(2), (4) Date: Aug. 6, 2013

(87) PCT Pub. No.: WO2012/065699
PCT Pub. Date: May 24, 2012

(65) Prior Publication Data
US 2013/0312208 A1 Nov. 28, 2013

(30) Foreign Application Priority Data
Nov. 16, 2010 (DE) .......................... 10 2010 052 315

(51) Int. Cl.
*B60S 1/40* (2006.01)
*B60S 1/38* (2006.01)

(52) U.S. Cl.
CPC ................. *B60S 1/40* (2013.01); *B60S 1/3851* (2013.01); *B60S 1/4048* (2013.01); *B60S 1/3868* (2013.01); *B60S 2001/4058* (2013.01); *Y10T 29/49826* (2015.01)

(58) Field of Classification Search
CPC .... B60S 1/3856; B60S 1/4041; B60S 1/3851; B60S 1/40; B60S 1/4048; B60S 1/4045; B60S 2001/4058; B60S 2001/4061; B60S 1/3868; Y10S 24/52; Y10T 29/49826
USPC ............................. 15/250.32, 250.46, 250.44
See application file for complete search history.

(56) References Cited

U.S. PATENT DOCUMENTS 2,974,341 A * 3/1961 Hart .......................... B60S 1/40
15/250.32

(Continued)

FOREIGN PATENT DOCUMENTS

| CN | 101535099 A | 9/2009 |
| DE | 1200704 | * 9/1965 |

(Continued)

OTHER PUBLICATIONS

Japanese Office Action dated Jun. 18, 2014 with partial English translation (Three (3) pages).

(Continued)

*Primary Examiner* — Gary Graham
(74) *Attorney, Agent, or Firm* — Crowell & Moring LLP (57) ABSTRACT

A connecting arrangement for connecting a wiper blade to a wiper arm for a windscreen wiper system of a vehicle. An adaptor for holding the wiper blade is fitted onto the wiper arm in an installation direction running transversely with respect to a wiping surface definable by the wiping movement of the wiper blade. The connecting arrangement includes a securing element designed as a sliding latch arranged on the wiper arm. The sliding latch, which has a U-profile in cross section, serves for the positionally secured holding of the adaptor on the wiper arm, and the sliding latch is displaceable along the wiper arm from an installation position into a functional position securing the adaptor. The sliding latch has a back and two limbs, and at least one projection engaging around the wiper arm on the lower side is arranged on the limbs of the sliding latch.

10 Claims, 6 Drawing Sheets

(56) References Cited

U.S. PATENT DOCUMENTS

| | | | |
|---|---|---|---|
| 6,654,983 | B1 | 12/2003 | Raynaud |
| 2008/0134455 | A1 | 6/2008 | Kinnaert et al. |
| 2010/0011528 | A1 | 1/2010 | Boland |

FOREIGN PATENT DOCUMENTS

| | | |
|---|---|---|
| DE | 691 01 340 T2 | 6/1994 |
| DE | 101 30 903 A1 | 5/2002 |
| DE | 10 2005 016 485 A1 | 8/2006 |
| DE | 10 2008 011 449 A1 | 9/2009 |
| DE | 10 2008 049 272 A1 | 4/2010 |
| EP | 1 876 073 A1 | 1/2008 |
| JP | 2002-522289 A | 7/2002 |
| JP | 2007-216736 A | 8/2007 |
| WO | WO 00/07857 A1 | 2/2000 |
| WO | WO 2009/133979 A1 | 11/2009 |

OTHER PUBLICATIONS

German-language Written Opinion (PCT/ISA/237) dated Mar. 27, 2012 (Six (6) pages).
German-language Office Action dated Mar. 28, 2011 (Three (3) pages).
International Search Report dated Mar. 27, 2012 with English translation (Eight (8) pages).
German-langauge Office Action dated Feb. 17, 2014 (six (6) pages).
Chinese Office Action dated Dec. 22, 2014, including English translation (thirteen (13) pages).

\* cited by examiner

CONNECTING ARRANGEMENT AND METHOD FOR CONNECTING A WIPER BLADE TO A WIPER ARM FOR A WINDSCREEN WIPER SYSTEM OF A VEHICLE

BACKGROUND AND SUMMARY OF THE INVENTION

Exemplary embodiments of the present invention relate to a connecting arrangement for connecting a wiper blade to a wiper arm for a windscreen wiper system of a vehicle. The connecting arrangement comprises a connecting element designed for holding the wiper blade, which can be fitted onto the wiper arm in an installation direction which runs transversely with respect to a wiping surface definable by the wiping movement of the wiper blade. At least one securing element of the connecting arrangement serves for the positionally secured holding of the connecting element on the wiper arm. Furthermore, exemplary embodiments of the present invention relate to a method for connecting a wiper blade to a wiper arm of a windscreen wiper system of a vehicle.

German patent document DE 691 01 340 T2 describes an articulated connection between a wiper arm and a wiper blade. In the wiper arm, which has a U-profile in cross section, an opening is provided to receive a latch that can be displaced along the wiper arm. If the latch is displaced away from the free end of the wiper arm, in other words backwards, a slot provided on the latch releases an articulation axle that joins two longitudinal walls of a chuck together. The chuck is pushed here into an opening which is made in a main bracket of the wiper blade, wherein clamps formed on the chuck latch into recesses made on the main bracket.

German patent document DE 101 30 903 A1 describes a wiper arm of a windscreen wiper system for a vehicle, the end region of which has a U-profile in cross section that is open downwards. An adaptor that holds a wiper blade can be inserted from below into the end region of the wiper arm, that is to say in an installation direction running perpendicularly with respect to a wiping surface definable by the wiping movement of the wiper blade. The side walls of the adaptor have recesses whose internal dimensions correspond to the external dimensions of projections protruding in a lateral and inward direction from limbs of the wiper arm. When the adaptor is inserted into the end region of the wiper arm in the installation direction, the projections therefore move along the recesses. To lock the adaptor in respect of the wiper arm, the adaptor is displaced together with the wiper blade towards an open end of the wiper arm and the projections on the wiper arm extend into latching recesses provided on the adaptor. A latching tongue arranged on the adaptor is inserted into a recess arranged on the wiper arm in this positionally secured position of the adaptor and thereby indicates that the adaptor has reached its operational position.

German patent document DE 10 2008 011 449 A1 likewise describes a connection of a wiper blade to a wiper arm by means of an adaptor on the wiper blade, which adaptor is inserted from below into an end region of the wiper arm. The adaptor is then displaced together with the wiper blade laterally towards one end of the wiper arm in order to lock the adaptor in respect of the wiper arm and therefore bring the adaptor into a functional position.

The fact that securing the adaptor in its position with respect to the wiper arm requires cumbersome handling of the adaptor is to be regarded as a disadvantage of these kinds of connecting arrangements.

German patent document DE 10 2005 016 485 A1 describes a device for connecting a wiper blade to a wiper arm of a windscreen wiper system in an articulated fashion. An end region of the wiper arm is designed as a downwardly open, cuboid hollow body having two projections protruding inwardly from its side walls. An adaptor for holding a wiper blade has two latching tongues that latch with the two projections when the adaptor is pushed into the hollow body on the wiper arm from below. A further projection formed on a side wall of the hollow body and projecting inwardly engages in a depression that is made in the adaptor. In this way, the adaptor is held positionally secured in the end region of the wiper arm.

This kind of connecting arrangement is comparatively complex and it is also difficult to remove the adaptor and with it the wiper blade from the wiper arm.

Exemplary embodiments of the present invention provide a connecting arrangement of the kind specified at the beginning and a corresponding method enabling particularly simple and functionally reliable connection of a wiper blade to a wiper arm of a windscreen wiper system.

The connecting arrangement according to the invention for connecting a wiper blade to a wiper arm of a windscreen wiper system of a vehicle comprises a connecting element designed for holding the wiper blade. The connecting element can be fitted onto the wiper arm in an installation direction running transversely with respect to a wiping surface definable by the wiping movement of the wiper blade. A securing element of the connecting arrangement, which serves for the positionally secured holding of the connecting element on the wiper arm, is designed as a slider arranged on the wiper arm and having a U-profile in cross section, which can be displaced along the wiper arm from an installation position into a functional position securing the connecting element. A particularly simple and functionally reliable connection of the wiper blade to the wiper arm is achieved here by the connecting element not having to be displaced together with the wiper blade from the installation position into the functional position in order to fix the wiper blade on the wiper arm. Instead, the connecting element remains in its installation position, while only the slider is displaced along the wiper arm in order to secure the connecting element from working loose from the wiper arm. This makes it far easier to handle the wiper blade when fitting it onto or removing it from the wiper arm.

The slider has a back and two limbs, wherein at least one projection engaging around the wiper arm on the lower side is arranged on the limbs of the slider. A slider of this kind provides impact protection if the wiper arm without a wiper blade fitted to it strikes the windscreen, for example due to an oversight by a mechanic after removing the wiper blade from the wiper arm. Impact protection of this kind is particularly effective if the wiper arm is made of metal and the slider is made of a flexible material such as plastic. The slider, which engages around the wiper arm on the lower side, also ensures particularly good guidance of the slider along the wiper arm.

A wiper blade having the connecting element is fitted onto the wiper arm particularly easily and intuitively here by a mechanic, ensuring a particularly high degree of reliability against incorrect fitting. To remove the wiper blade, the slider merely needs to be moved from the functional position securing the connecting element into the installation position, and then the connecting element and with it the wiper blade can be removed from the wiper arm counter to the installation direction.

As a pressing force, which presses the wiper blade against the windscreen, is applied to the wiper arm when the wiper blade is on the windscreen of the vehicle, the wiper arm can also reliably move the wiper blade over the windscreen if the slider is in the installation position rather than in the functional position. This applies even if the slider is defective so that it does not secure the connecting element as desired even in the functional position.

The connecting arrangement described here can also be produced with a comparatively small connecting element. This is advantageous in that only a small amount of water is released by the connecting element onto the windscreen of the vehicle with a connecting element that requires little structural space, even if it is raining or washer fluid is hitting the windscreen.

In an advantageous embodiment of the invention, one end region of the slider extends beyond an end region of the wiper arm in the installation position. As a result, a mechanic can very easily tell whether the slider is in the installation position or in the functional position securing the connecting element.

It is also advantageous if the wiper arm has at least one latching notch that is engaged with a latching nose arranged on the slider in the functional position and/or in the installation position of the slider. This is because the latching of the latching nose in the latching notch is both visibly noticeable and can be heard and felt. In this way, the mechanic can be informed that the slider is in the functional position or in the installation position. It is particularly favorable if one and the same latching nose is in engagement with a first latching notch in the functional position and with a second latching notch in the installation position. Alternatively, however, only one latching notch may also be provided, which is assigned to one of the two positions. The wiper arm can also have the latching nose and the slider the latching notches.

In a further advantageous embodiment of the invention, the wiper arm has a U-profile in cross section at least in the region of the connecting element, wherein in a back of the wiper arm is arranged a through-opening in which a corresponding projection of the connecting element is received in the installation position. If the projection, the external dimensions of which correspond to the internal dimensions of the through-opening, is received in the through-opening, then it is ensured that the connecting element and with it the wiper blade cannot move either in the direction of the longitudinal extent of the wiper arm or transversely with respect to this direction of longitudinal extent. In other words, the connecting element and with it the wiper blade are secured and fixed in their position in the plane of the wiping surface by such an adjustment of the projection and of the through-opening corresponding to it. The mechanic can also tell, when the projection is passed through the through-opening, that the connecting element is in the correct installation position in which the slider can be displaced into the functional position securing the connecting element.

If the projection and the through-opening are other than round in shape, for example if the projection and the through-opening are designed to be oval or angular, in particular rectangular or square, then the connecting element can also be secured against rotation in respect of the wiper arm by bringing the projection into engagement in the through-opening.

At least a part region of the projection preferably has a contour that is the same as a contour of a recess provided on the slider, wherein at least the part region of the projection abuts with the recess in the functional position of the slider. In this way, by bringing the slider into abutment with the part region of the projection, it is possibly to visually determine whether the slider has reached the functional position. This is because this is not the case if there is still a gap between the contour delimiting the recess on the slider and the contour of the part region of the projection.

It has proven to be even more advantageous if the through-opening and the projection corresponding to it are specifically designed for a respective place at which the wiper arm is affixed to the vehicle. For example, the geometry of the through-opening and of the projection for a driver-side wiper arm and the associated wiper blade may differ from the geometry for a passenger-side wiper arm and the associated wiper blade. A respectively specific geometry of the through-opening and of the projection may also be provided for a wiper arm for a right-hand-drive vehicle or a left-hand-drive vehicle in order to ensure that only the actually associated wiper blade can be fitted to the wiper arm provided for it. Such protection against mix-ups can also be provided in order to be able to distinguish the wiper arm and the wiper blade of a rear windscreen wiper from a wiper arm and the wiper blade of a front windscreen wiper.

It is also advantageous if the slider comprises a front wall by means of which an open end region of the wiper arm can be closed at least in part in the functional position. The slider therefore protects the connecting element received in the end region of the wiper arm and, at the same time, provide a visually attractive end of the end region of the wiper arm. The front wall closing the wiper arm to the front, that is to say in the direction of the longitudinal extent thereof, also protects the windscreen to a particularly great extent if the wiper arm having no wiper blade accidentally strikes it.

In order to achieve particularly secure fixing of the connecting element on the wiper arm in the installation position, provision can be made, according to a further advantageous embodiment of the invention, for the wiper arm to have at least one recess open in the installation direction which is designed to receive a corresponding projection formed on the connecting element.

It has proven to be even more advantageous if the connecting element comprises a lower part holding the wiper blade and an upper part fixed to the wiper arm in the functional position, wherein the lower part is held relative to the upper part so that it can move on the latter. As a result, the wiper blade can be adjusted to the course of the windscreen surface when the windscreen, which is usually spherically curved, is being wiped. Because the parts that allow relative movement between wiper arm and wiper blade and are susceptible to wear are parts of the connecting element, these are likewise replaced when replacing the wiper blade together with the connecting element. This ensures that the relative movement between wiper blade and wiper arm remains smooth.

The upper part is preferably designed as a rocker rotatably supported on a pin or bearing bolt that is passed through a passage opening in the lower part. Such bearing of the upper part on the lower part ensures particularly smooth relative movement between wiper arm and wiper blade.

At least one stop formed on the lower part preferably limits the relative movement of the upper part in respect of the lower part. This is because stops can be used to limit the relative movement of the wiper blade in respect of the wiper arm particularly easily to the small degree required.

If the wiper arm, according to a further advantageous embodiment of the invention, is in abutment with side walls of the upper part in the functional position, this likewise ensures a fixing of the connecting element on the wiper arm that is particularly secure, in particular secure against rotation.

Finally, it has proven advantageous if the slider and/or the wiper arm have a recess designed to receive a component of the wiper blade if the wiper blade moves relative to the wiper arm. As a result, the slider and the wiper arm can be closed to a particularly large extent in a visually and acoustically advantageous manner, and the relative movement of the wiper blade in respect of the wiper arm is nevertheless possible as a result of the recesses.

In the method according to the invention for connecting a wiper blade to a wiper arm of a windscreen wiper system of a vehicle, a connecting element designed for holding the wiper blade is fitted onto the wiper arm in an installation direction running transversely with respect to a wiping surface definable by the wiping movement of the wiper blade. By means of at least one securing element, the connecting element is held positionally secured on the wiper arm. In this case, as a securing element, a slider arranged on the wiper arm and having a U-profile in cross section is displaced along the wiper arm from an installation position into a functional position securing the connecting element.

The advantages and preferred embodiments described in respect of the connecting arrangement according to the invention also apply to the method according to the invention.

The features and combinations of features specified in the description above and the features and combinations of features specified in the description of the figures and/or in the figures only below can be used not only in the combination specified in each case, but also in other combinations or on their own without falling outside the scope of the invention.

BRIEF DESCRIPTION OF THE DRAWING FIGURES

Further advantages, features and details of the invention can be seen in the claims, the following description of preferred embodiments and by reference to the drawings. The following can be seen in the drawings:

DETAILED DESCRIPTION

Figure 1:
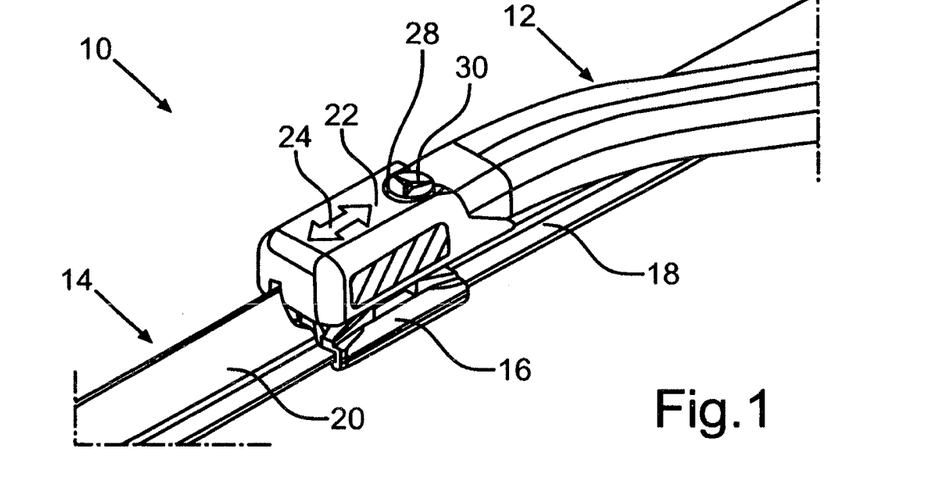
FIG. 1 illustrates a part of a wiper arm of a windscreen wiper system of a vehicle with a wiper blade fixed to the wiper arm, wherein a sliding latch fixes an adaptor holding the wiper blade.

FIG. 1 shows part of a wiper arm 12 and a wiper blade 14 of a windscreen wiper system 10 of a vehicle. Of an adaptor 26 (cf. FIG. 2) that is received in an end region of the wiper arm 12 designed as a receiving region, FIG. 1 shows only a lower part designed as a rider 16, which engages around spring strips 18 of the wiper blade 14 and therefore holds the wiper blade 14. The wiper blade 14 also comprises a spoiler 20 and a blade rubber (not shown in FIG. 1) to wipe a windscreen (also not shown) of the vehicle.

In order to hold the adaptor 26 securely on the wiper arm 12, a sliding latch 22 is arranged on the wiper arm 12, which is held thereon such that it can be displaced in a direction of the longitudinal extent of the wiper arm 12. An arrow symbol 24 applied to the sliding latch 22 in the form of a double arrow shows the directions in which the sliding latch 22 can be displaced in respect of the wiper arm 12.

In a functional position of the sliding latch 22 shown in FIG. 1, the latter ensures that the adaptor 26 (cf. FIG. 2) and with it the wiper blade 14 cannot be removed from the wiper arm 12. In this functional position of the sliding latch 22, a recess 28 provided in the sliding latch 22 and having a semi-circular contour is in abutment with a cylindrical part region 30 of a projection 32 protruding upwards over a base body of a rocker 34 of the adaptor 26 (cf. FIG. 2).

Figure 2:
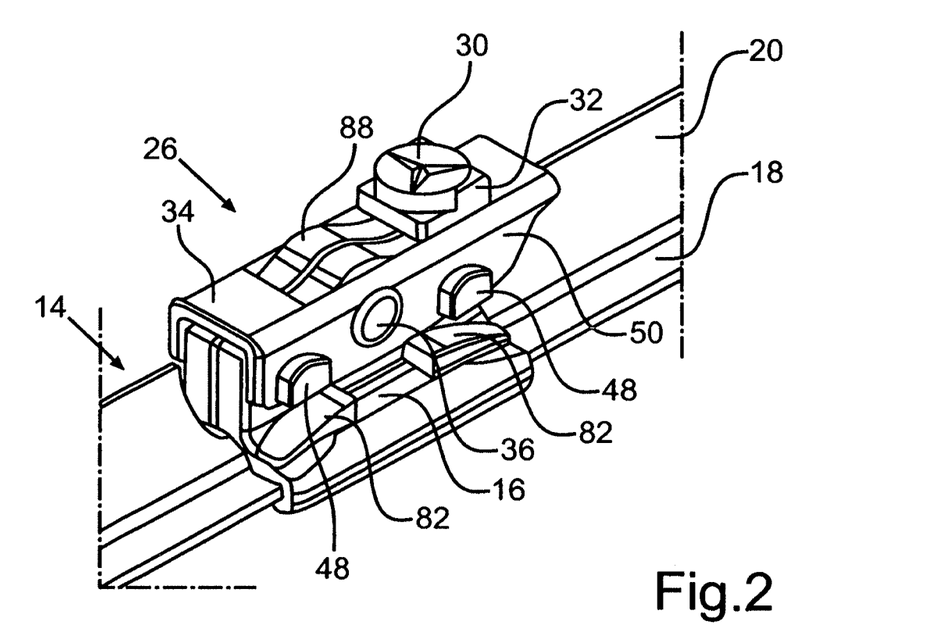
FIG. 2 illustrates the wiper blade according to FIG. 1 with the adaptor comprising a rocker and a rider.
Figure 5:
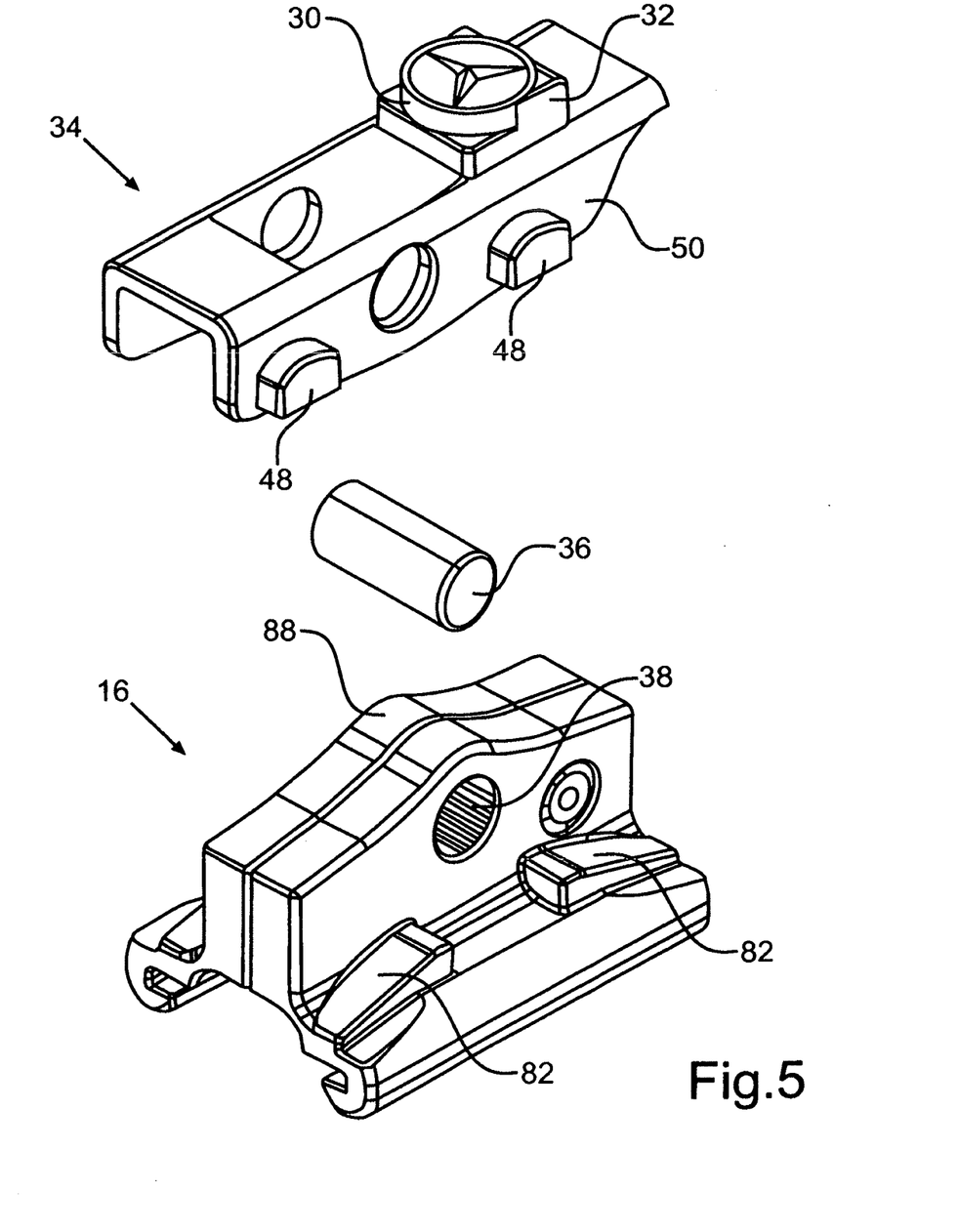
FIG. 5 illustrates an exploded representation of components of the adaptor.

FIG. 2 shows the rocker 34 which is designed as an upper part of the multipart adaptor 26, without the sliding latch 22 concealing the rocker 34. The rocker 34 is supported on a pin-shaped bearing bolt 36 which is pushed through a passage opening 38 provided in the rider 16 (cf. FIG. 5). Ribs can be provided in the passage opening 38 in order to fix the bearing bolt 36 so that it cannot rotate therein (cf. FIG. 5).

If the wiper blade 14 is to be received in the end region 40 of the wiper arm 12 by means of the adaptor 26 holding the wiper blade 14, it is inserted from below into the end region 40 of the wiper arm 12 which is open downwards (cf. FIG. 9). For this purpose, the sliding latch 22 is first displaced into an installation position shown in FIG. 9 and allowing the adaptor 26 to be fitted, which is likewise a removal position allowing the adaptor 26 to be removed.

Figure 3:
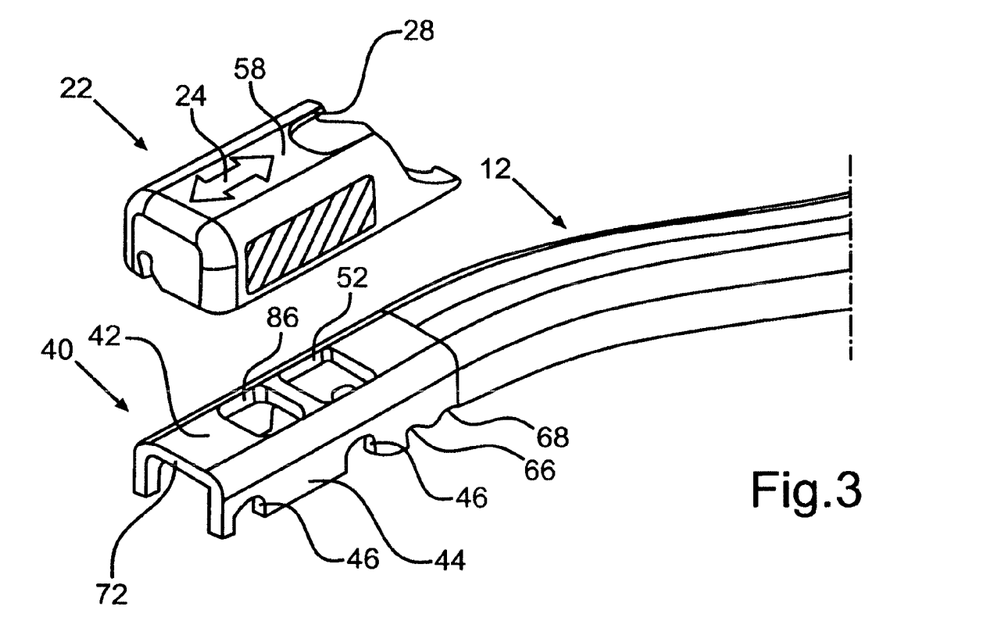
FIG. 3 illustrates the wiper arm and the sliding latch removed from the wiper arm in a perspective view.

As can be seen in FIG. 3, the end region 40 of the wiper arm 12 has a U-profile in cross section which comprises a back 42 and two limbs 44 extending downwards from the back 42. The limbs 44 each have two downwardly open recesses 46 which, if the adaptor 26 is brought into the end region 40, receive two bar studs 48 that extend beyond respective side walls 50 of the rocker 34 (cf. FIG. 2).

If the four bar studs 48 are received in the four recesses 46 corresponding to them in the two limbs 44 of the end region 40 of the wiper arm 12, the adaptor 26 can no longer move in the direction of the longitudinal extent of the wiper arm 12. The projection 32 of the rocker 34 then also passes through a through-opening 52 in the back 42 of the wiper arm 12. A further recess 86 in the back 42 of the wiper arm 12 serves to receive an elevation 88 of the rider 16 that the latter has in the region of the passage opening 38 (cf. FIG. 3 and FIG. 5).

If the adaptor 26 is inserted into the end region 40 of the wiper arm 12, the side walls 50 of the rocker 34 are in abutment with the inner sides of the limbs 44. As a result, the adaptor 26 is also fixed to the wiper arm 12 in a direction transversely with respect to the direction of extent of the wiper arm 12, in other words transversely with respect to the direction of longitudinal extent of the wiper blade 14.

Furthermore, the sliding latch 22 also ensures that the adaptor 26 cannot move out of the receiving region 40 of the wiper arm 12 upwards, in other words perpendicularly with respect to the wiping surface definable by the wiping movement of the wiper blade 14.

Figure 4:
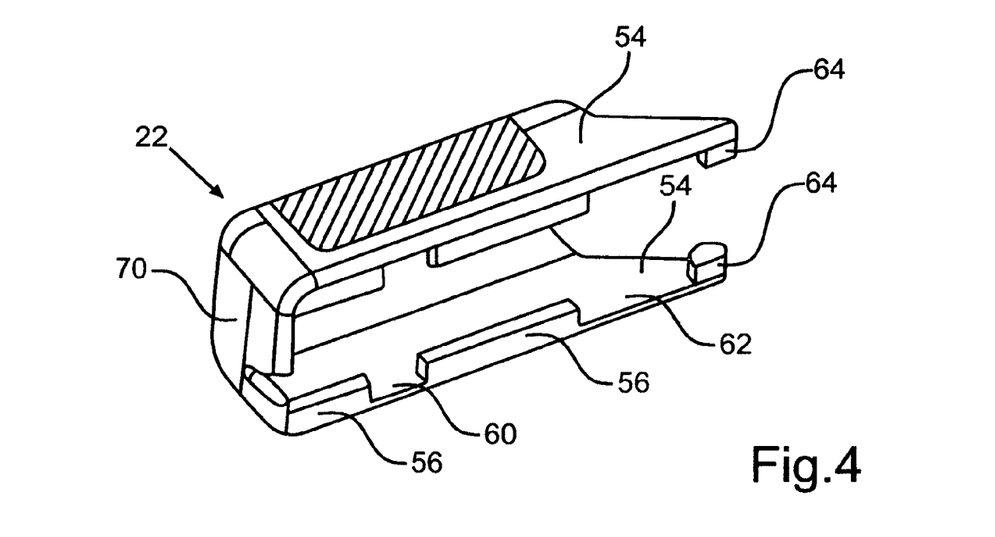
FIG. 4 illustrates the sliding latch viewed from below.

For this purpose, as shown in particular in FIG. 4, two rails 56 are arranged on respective side walls 54 of the sliding latch 22 likewise having a U-profile in cross section, these rails 56 projecting inwardly from an inner side of the respective side wall 54. These rails 56 engage around the wiper arm 12 in the end region 40 on the lower side and therefore serve, in cooperation with a back 58 connecting the side walls 54 of the sliding latch 22 (cf. FIG. 3) as a guide for the translational displacement of the sliding latch 22 relative to the wiper arm 12.

The bar studs 48 received in the recesses 46 of the wiper arm 12 also rest on the rails 56 of the sliding latch 22 if the latter is displaced into its functional position shown in FIG. 1, in other words in this case backwards.

A region 60 between the two rails 56 and a region 62 between the rear rail 56 and a latching nose 64 likewise projecting inwardly from the side wall 54 make it possible, when the sliding latch 22 is displaced into the installation position, to bring the bar studs 48 of the rocker 34 into the recesses 46 provided in the side walls 44 of the wiper arm 12 by inserting the adaptor 26 from below into the end region 40 of the wiper arm 12.

The latching noses 64 projecting inwardly from the side walls 54 of the sliding latch 22 can be inserted into front latching notches 66 or into rear latching notches 68 that are made in the two limbs 44 of the wiper arm 12 in the end region 40 thereof. If the respective latching nose 64 is in the front latching notch 66, then the sliding latch 22 protrudes forward over the end region 40 of the wiper arm 12 and a front wall 70 of the sliding latch 22 is spaced apart from an end 72 of the wiper arm 12 (cf. FIG. 3, FIG. 4 and FIG. 8).

If, on the other hand, the sliding latch 22 is displaced backwards, the latching nose 64 is then in the rear latching notch 68 (cf. FIG. 6), so the front wall 70 of the sliding latch 22 is in abutment with the front end 72 of the wiper arm 12. A mechanic working on the sliding latch 22 can clearly hear and feel, in other words haptically determine, whether the latching nose 64 is latched in the front latching notch 66 or in the rear latching notch 68.

A further, visual indication that the installation position of the sliding latch 22 allowing the adaptor 26 to be fitted or removed from the end region 40 of the wiper arm 12 has been reached is given by the position of the part region 30. The part region 30, which emerges over the through-opening 52 in the back 42 of the wiper arm 12, is in abutment with the recess 28 provided in the sliding latch 22 if the latching nose 64 is in the rear latching notch 68 (cf. FIG. 1 and FIG. 6).

Figure 7:
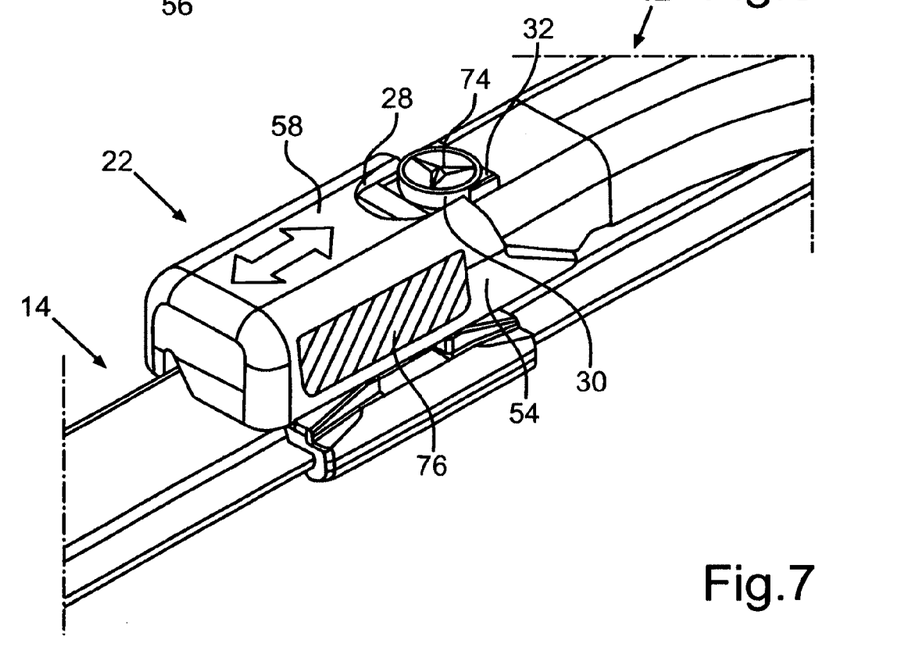
FIG. 7 illustrates the wiper arm with its sliding latch displaced forward into a removal position in which the adaptor can be removed from the end region of the wiper arm by pulling downwards.
Figure 8:
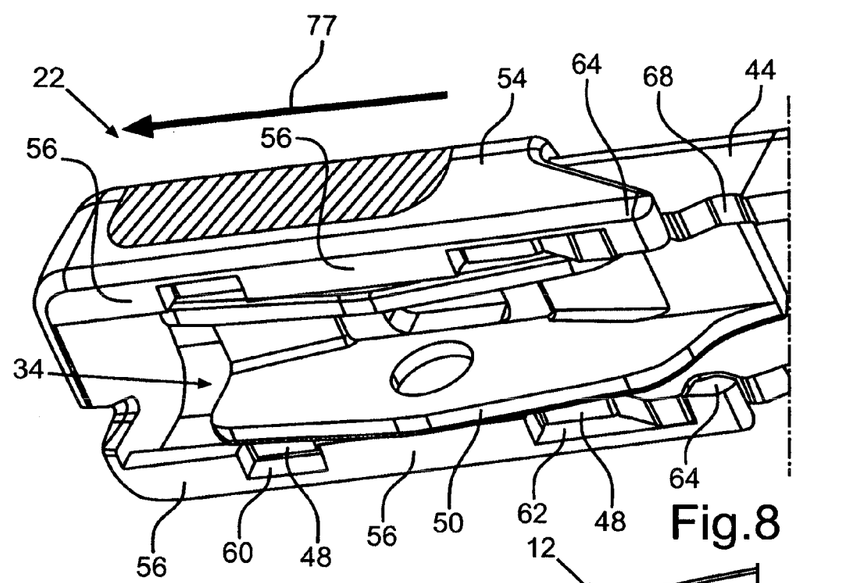
FIG. 8 illustrates a view from below of the end region of the wiper arm with the rocker received therein, wherein the sliding latch is displaced in to the removal position shown in FIG. 7.

If, on the other hand, the sliding latch 22 is pulled forward, then the latching nose 64 is in the front latching notch 66 (cf. FIG. 8). The rear latching notch 68 is then free here and there is a space between the part region 30 of the projection 32 and the recess 28 in the back 58 of the sliding latch 22 (cf. FIG. 7).

Figure 6:
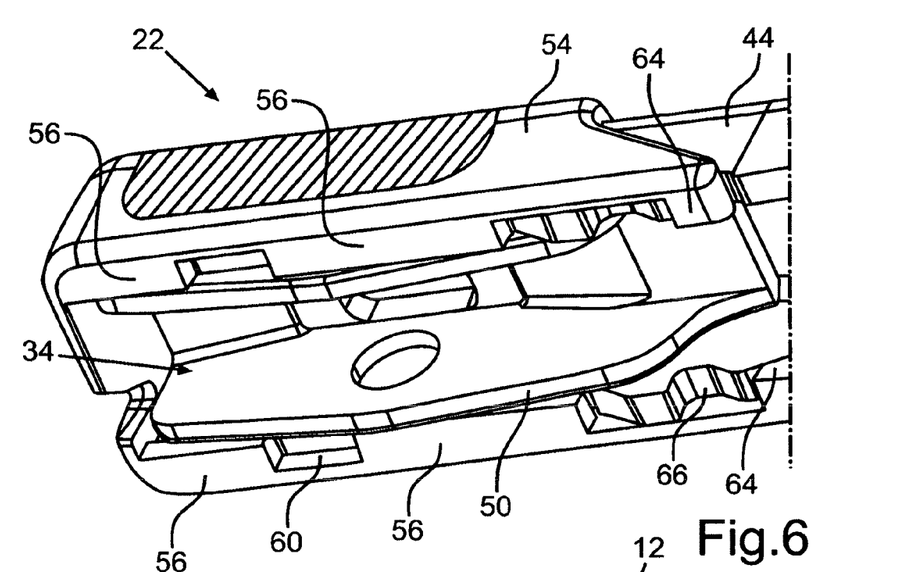
FIG. 6 illustrates a view from below of the rocker of the adaptor received in an end region of the wiper arm, which is secured in its position by the sliding latch displaced into its functional position.

FIG. 6 shows the sliding latch 22, which holds the rocker 34, displaced into its functional position in that the bar studs 48 arranged on the side walls 50 of the rocker 34 rest on the laterally inwardly projecting rails 56 of the sliding latch 22. In the functional position, the latching nose 64 formed on the sliding latch 22 is in engagement with the rear latching notch 68 in the limb 44 of the wiper arm 12. The front latching notch 66, on the other hand, is free.

In contrast, in the installation position or removal position of the sliding latch 22 shown in FIG. 7, the latter is displaced forward and the rear latching notch 68 is free while the latching nose 64 is inserted into the front latching notch 66. The cylindrical part region 30 of the projection 32 of the rocker 34 is spaced apart from the semi-circular recess 28 in the back 58 of the sliding latch 22.

The cylindrical part region 30 can, as shown by way of example in this case, to aid clarity, have an emblem 74, for example a trade mark emblem, that stands out in the form of a relief, or such an emblem 74 can be made to stand out here in some other way, for example through use of a different colour. In order to ensure that the sliding latch 22 is particularly easy to operate when it is being displaced with respect to the wiper arm 12, the limbs 54 of the sliding latch 22 have a ribbing 76 here.

FIG. 8 shows the sliding latch 22 releasing the rocker 34, in other words the sliding latch 22 displaced forward into the installation position or removal position (cf. FIG. 7) in a perspective view from below. The direction of displacement forwards is shown by an arrow 77. In the removal position, the bar studs 48 are level with the regions 60, 62, so they are no longer resting on the rails 56. The latching nose 64 is latched into the front latching notch 66. The latching of the latching nose 64 in the front latching notch 66 as a result of the forward displacement can be clearly heard and felt by the mechanic.

Figure 9:
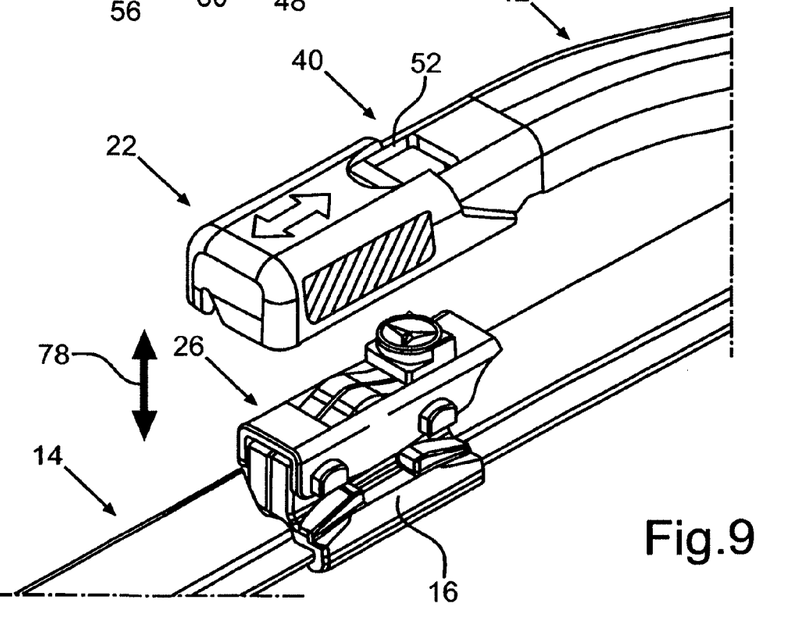
FIG. 9 illustrates the adaptor removed downwards from the end region of the wiper arm and holding the wiper blade, and the wiper arm with the sliding latch in its removal position.

Then, as shown in FIG. 9, the adaptor 26 holding the wiper blade 14 by means of the rider 16 can be removed from the end region 40 of the wiper arm 12 downwards, in other words perpendicularly with respect to the wiping surface definable by the wiping movement of the wiper blade 14.

The installation direction and the removal direction are shown by a movement arrow 78 in FIG. 9. When being fitted, the adaptor 26 and with it the wiper blade 14 are moved upwards and, when being removed to change a wiper blade 14 that has to be replaced, they are correspondingly moved downwards.

Figure 10:
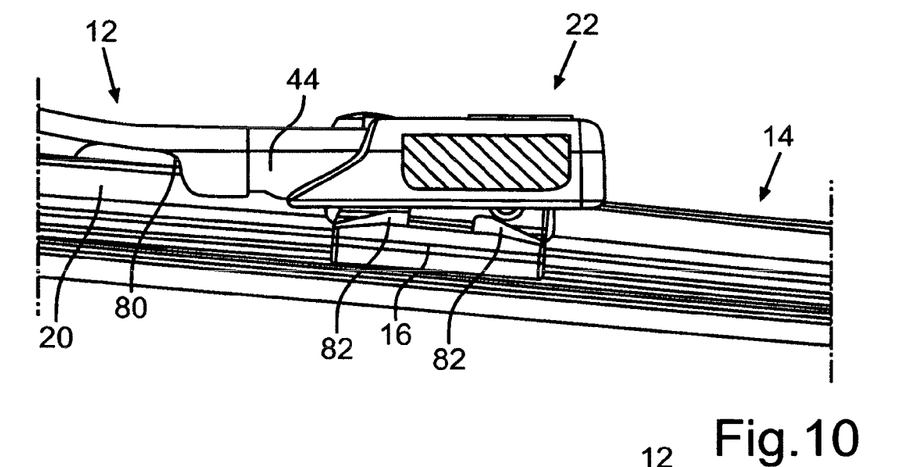
FIG. 10 illustrates a side view of the wiper arm with the wiper blade held on it.

FIG. 10 shows the wiper arm 12 holding the wiper blade 14 in a side view, wherein the wiper blade 14 is tilted relative to the wiper arm 12, that is to say as a result of the tilting of the rider 16 relative to the rocker 34 resting on the wiper arm 12. This side view shows that one of the limbs 44 of the wiper arm 12 has a recess 80 that allows an upwards movement of the spoiler 20 caused by the tilting of the wiper blade 14.

Two stops 82 formed on each side of the rider 16 and bevelled to respective outer sides of the rider 16 (cf. FIG. 5) limit the relative movement of the rider 16 in respect of the rocker 34. The tilting of the wiper blade 14 in the direction opposite the direction shown in FIG. 10 causes the spoiler 20 to move upwards in its region arranged in front of the rider 16. In the process, a recess that is in the form of a notch 84 and is arranged in the front wall 70 of the sliding latch 22 ensures that the spoiler 20 can move upwards (cf. FIG. 11).

Figure 11:
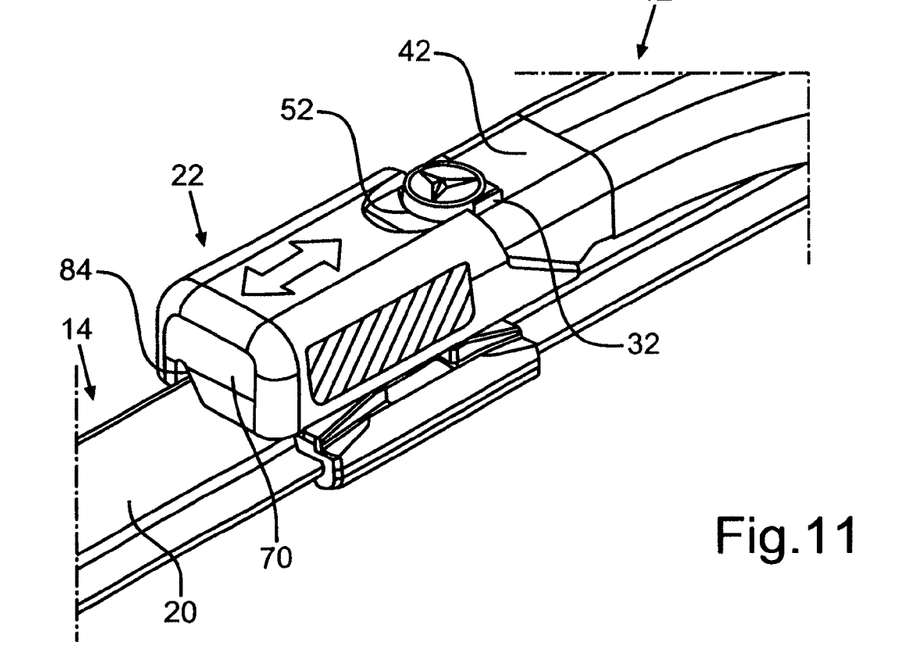
FIG. 11 illustrates an alternative design of a wiper arm with a wiper blade arranged thereon, which is held by a wiper-arm-specific adaptor.

Finally, FIG. 11 shows, by way of example, how incorrect fitting is avoided in this case through the geometric arrangement of the projection 32 of the rocker 34 and the recess 52 corresponding to this projection 32 in the back 42 of the wiper arm 12. For example, for a passenger-side wiper arm 12 and the wiper blade 14 associated with it, a specific design of the projection 32 corresponding to the place at which the wiper arm 12 is affixed and of the recess 52 corresponding to it can be provided.

In the design of the wiper arm 12 and of the rocker 34 shown in FIG. 11, the recess 52 is not rectangular (as is the case, for example, with the design of the projection 32 and recess 52 in FIG. 9), but the projection 32 is instead rectangular in its rear region and semi-circular in its front region. Accordingly, the recess 52 corresponding to this partially semi-circular projection 32 in the back 42 of the wiper arm 12 is likewise semi-circular in the front region and angular in the rear region. In alternative embodiments, different designs of projection 32 and recess 52 can ensure against mix-ups.

The connecting arrangement shown here for connecting the wiper blade 14 to the wiper arm 12 is possible both using designs of the wiper arm 12 in which the latter is formed as a simple rod arm, and using wiper arms 12 in which the latter has a more robust design, for example a different shape in the end region 40 and in the rear region of the wiper arm 12 adjoining the end region 40 respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A connecting arrangement for connecting a wiper blade to a wiper arm for a windscreen wiper system of a vehicle, the connecting arrangement comprising:
   a connecting element configured to hold the wiper blade, which can be fitted onto the wiper arm in an installation direction running transversely with respect to a wiping surface definable by a wiping movement of the wiper blade,
   wherein the connecting arrangement has at least one securing element for positionally secured holding of the connecting element on the wiper arm,
   wherein the at least one securing element is a slider arranged on the wiper arm and having a U-profile in cross section, the at least one securing element is displaceable along the wiper arm from an installation position allowing fitting of the connecting element into a functional position securing the connecting element,
   wherein the slider has a back and two limbs, and
   wherein at least one projection engaging around the wiper arm on a lower side is arranged on the limbs of the slider.

2. The connecting arrangement according to claim 1, wherein an end region of the slider extends beyond an end region of the wiper arm in the installation position.

3. The connecting arrangement according to claim 1, wherein the wiper arm has at least one latching notch engaged with a latching nose arranged on the slider in the functional position or in the installation position of the slider.

4. The connecting arrangement according to claim 1, wherein the wiper arm has a U-shaped profile in cross section at least in a region of the connecting element, wherein in a back of the wiper arm a through-opening is configured such that a corresponding projection of the connecting element is received in the installation position.

5. The connecting arrangement according to claim 4, wherein at least a part region of the projection has a contour that is a same as a contour of a recess provided on the slider, wherein at least the part region of the projection abuts with the recess in the functional position of the slider.

6. The connecting arrangement according claim 1, wherein the wiper arm has at least one recess open in the installation direction, which is configured to receive a corresponding projection formed on the connecting element.

7. The connecting arrangement according to claim 1, wherein the connecting element comprises a lower part holding the wiper blade and an upper part fixed to the wiper arm in the functional position, wherein the lower part is held relative to the upper part so that the lower part can move on the upper part.

8. The connecting arrangement according to claim 7, wherein the upper part is a rocker rotatably supported on a pin passing through a passage opening in the lower part.

9. The connecting arrangement according to claim 7, further comprising:
   at least one stop formed on the lower part to limit relative movement of the upper part with respect to the lower part.

10. A method for connecting a wiper blade to a wiper arm for a windscreen wiper system of a vehicle, in which a connecting element configured to hold the wiper blade is fitted onto the wiper arm in an installation direction running transversely with respect to a wiping surface definable by a wiping movement of the wiper blade and in which the connecting element is held positionally secured on the wiper arm by at least one securing element wherein the at least one securing element is a slider, the method comprising:
    displacing the slider, which is arranged on the wiper arm and has a U-profile in cross section, along the wiper arm from an installation position into a functional position securing the connecting element, wherein the slider has a back and two limbs and wherein at least one projection engaging around the wiper arm on a lower side is arranged on the limbs of the slider.

* * * * *